US012009609B2

(12) United States Patent
Ikeda et al.

(10) Patent No.: US 12,009,609 B2
(45) Date of Patent: Jun. 11, 2024

(54) ANTENNA DEVICE

(71) Applicants: DENSO CORPORATION, Kariya (JP); SOKEN, INC., Nisshin (JP)

(72) Inventors: Masakazu Ikeda, Nisshin (JP); Yuuji Kakuya, Nisshin (JP); Kenichiro Sanji, Nisshin (JP); Nobuyasu Okabe, Kariya (JP); Hiroyuki Izumi, Kariya (JP)

(73) Assignees: DENSO CORPORATION, Kariya (JP); SOKEN, INC., Nisshin (JP)

( * ) Notice: Subject to any disclaimer, the term of this patent is extended or adjusted under 35 U.S.C. 154(b) by 315 days.

(21) Appl. No.: 17/484,207

(22) Filed: Sep. 24, 2021

(65) Prior Publication Data

US 2022/0013913 A1 Jan. 13, 2022

Related U.S. Application Data

(63) Continuation of application No. PCT/JP2020/002866, filed on Jan. 28, 2020.

(30) Foreign Application Priority Data

Mar. 26, 2019 (JP) ................................ 2019-058816

(51) Int. Cl.
*H01Q 9/04* (2006.01)
*H01Q 1/42* (2006.01)
(Continued)

(52) U.S. Cl.
CPC ............. *H01Q 9/0421* (2013.01); *H01Q 1/42* (2013.01); *H01Q 1/48* (2013.01); *H01Q 1/526* (2013.01)

(58) Field of Classification Search
CPC ........... H01Q 1/42; H01Q 1/48; H01Q 1/526; H01Q 15/0086; H01Q 9/0421
See application file for complete search history.

(56) References Cited

U.S. PATENT DOCUMENTS 5,693,082 A * 12/1997 Warner ............. A61B 18/1815 607/101
6,552,467 B1 * 4/2003 Suriano ............... H02K 11/026 310/239

(Continued)

FOREIGN PATENT DOCUMENTS

JP 2000278030 A 10/2000
JP 2002111366 A 4/2002

(Continued)

*Primary Examiner* — Thien M Le
(74) *Attorney, Agent, or Firm* — Harness, Dickey & Pierce, P.L.C.

(57) ABSTRACT

An antenna device includes: a ground plate made of a conductor with a flat plate shape; an opposing conductive plate made of another conductor with a flat plate shape, arranged to space apart from the ground plate by a predetermined distance, and having a power supply point electrically connected to a power supply line; a short-circuit portion electrically connecting the opposing conductive plate and the ground plate; and a radio wave shield body for shielding a propagation of an electric field, which is arranged on an upper side of the opposing conductive plate and is made of a conductor or a dielectric material. Parallel resonance at a predetermined target frequency is generated by an inductance provided in the short-circuit portion and a capacitance between the ground plate and the opposing conductive plate.

10 Claims, 7 Drawing Sheets

(51) Int. Cl.
*H01Q 1/48* (2006.01)
*H01Q 1/52* (2006.01)

(56) References Cited

U.S. PATENT DOCUMENTS

| | | | |
|---|---|---|---|
| 7,911,386 B1 | 3/2011 | Itoh et al. | |
| 2002/0041254 A1 | 4/2002 | Nakano et al. | |
| 2003/0020661 A1* | 1/2003 | Sato | H01Q 5/321 343/866 |
| 2006/0267843 A1 | 11/2006 | Sakama et al. | |
| 2008/0048917 A1 | 2/2008 | Achour et al. | |
| 2008/0055177 A1* | 3/2008 | Dixon | H01Q 9/0407 343/700 MS |
| 2008/0172860 A1 | 7/2008 | Sakama et al. | |
| 2008/0258981 A1 | 10/2008 | Achour et al. | |
| 2009/0015354 A1* | 1/2009 | Kim | H01Q 15/006 174/262 |
| 2010/0156754 A1 | 6/2010 | Kondou | |
| 2013/0002377 A1* | 1/2013 | Toyao | H01Q 15/0086 333/246 |
| 2015/0037517 A1* | 2/2015 | Buriak | B05D 1/02 427/108 |
| 2015/0214630 A1 | 7/2015 | Shimura | |
| 2017/0149137 A1 | 5/2017 | Ikeda et al. | |
| 2019/0115660 A1* | 4/2019 | Inukai | H01Q 3/44 |
| 2019/0229411 A1 | 7/2019 | Sugimoto et al. | |
| 2020/0112106 A1* | 4/2020 | Misaki | H01Q 21/065 |
| 2020/0295457 A1* | 9/2020 | Yasuo | H01Q 3/44 |
| 2021/0194111 A1* | 6/2021 | Weis | H01Q 1/2291 |
| 2021/0361940 A1* | 11/2021 | Yeh | H01Q 1/38 |
| 2022/0085488 A1* | 3/2022 | Irci | H01Q 1/44 |

FOREIGN PATENT DOCUMENTS

| | | | |
|---|---|---|---|
| JP | 2005197776 | A | 7/2005 |
| JP | 2005286793 | A | 10/2005 |
| JP | 2006333403 | A | 12/2006 |
| JP | 2010141566 | A | 6/2010 |
| JP | 2014003670 | A | 1/2014 |
| JP | 2015142367 | A | 8/2015 |
| JP | 2016015688 | A | 1/2016 |
| JP | 2017152878 | A | 8/2017 |
| JP | 2018061137 | A | 4/2018 |
| WO | WO-2011114746 | A1 | 9/2011 |
| WO | WO-2015049816 | A1 | 4/2015 |

* cited by examiner

DISTRIBUTION OF VOLTAGE, CURRENT AND ELECTRIC FIELD

ANTENNA DEVICE

CROSS REFERENCE TO RELATED APPLICATION

The present application is a continuation application of International Patent Application No. PCT/JP2020/002866 filed on Jan. 28, 2020, which designated the U.S. and claims the benefit of priority from Japanese Patent Application No. 2019-058816 filed on Mar. 26, 2019. The entire disclosures of all of the above applications are incorporated herein by reference.

TECHNICAL FIELD

The present disclosure relates to an antenna device having a flat plate structure.

BACKGROUND

There are antenna devices which include: a flat plate shaped metal conductor (hereinafter referred to as a ground plate) functioning as a ground; a flat plate shaped metal conductor (hereinafter referred to as an opposing conductive plate) positioned so as to face the ground plate and having a power supply point arranged at an arbitrary position; and a short circuit portion that electrically connects the ground plate with the opposing conductive plate.

SUMMARY

According to an example, an antenna device includes: a ground plate made of a conductor with a flat plate shape; an opposing conductive plate made of another conductor with a flat plate shape, arranged to space apart from the ground plate by a predetermined distance, and having a power supply point electrically connected to a power supply line; a short-circuit portion electrically connecting the opposing conductive plate and the ground plate; and a radio wave shield body for shielding a propagation of an electric field, which is arranged on an upper side of the opposing conductive plate and is made of a conductor or a dielectric material. Parallel resonance at a predetermined target frequency is generated by an inductance provided in the short-circuit portion and a capacitance between the ground plate and the opposing conductive plate.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
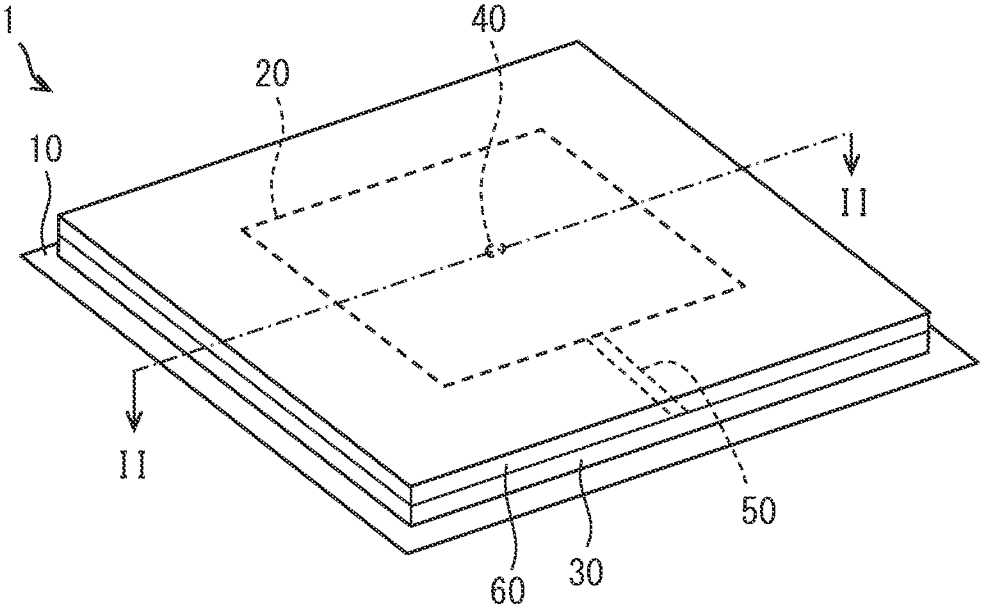
FIG. 1 is an external perspective view showing a configuration of an antenna device.

In a conceivable antenna device, parallel resonance is generated due to an electrostatic capacitance formed between the ground plate and the opposing conductive plate and an inductance included in the short circuit portion. This parallel resonance is generated at a frequency corresponding to that electrostatic capacitance and inductance. Specifically, the opposing conductive plate and the ground plate functions as a capacitor, and a vertical electric field is generated between the opposing conductive plate and the flat plate due to the current flowing through the short-circuit portion. The vertical electric field propagates from the short-circuited portion toward the outer peripheral portion and leaks into the space at the end of the opposing conductive plate, so that radio waves perpendicular to the ground plate can be radiated. Hereinafter, for convenience, an antenna device that operates by parallel resonance of the capacitance formed between the ground plate and the opposing conductive plate and the inductance provided in the short-circuit portion will be referred to as a 0th-order resonance antenna.

The capacitance formed between the ground plate and the opposing conductive plate is determined according to the area of the opposing conductive plate and the distance between the ground plate and the opposing conductive plate. Further, the inductance provided in the short-circuit portion is determined according to the diameter of the short-circuit portion. Therefore, for example, by adjusting the area of the opposing conductive plate and the diameter of the short-circuit portion, the frequency to be transmitted and received in the antenna device (hereinafter referred to as the target frequency) can be set to a desired frequency. In addition, a conceivable device has a configuration in which a plurality of patch units provided with an opposing conductive plate and a short-circuit portion are periodically arranged. Such a configuration in which the zeroth-order resonant antennas are periodically arranged is also referred to as a metamaterial antenna.

When the inventors verified the operation mode of the 0th-order resonant antenna, it was found that the vertical electric field radiated from the edge of the opposing conductive plate wraps around the upper side of the opposing conductive plate. When the vertical electric field wraps around the upper side of the opposing conductive plate, the vertical electric field propagating in the horizontal direction of the antenna is reduced by that amount. That is, the gain in the horizontal direction of the antenna may be reduced. It was also found that the tendency thereof becomes more remarkable as the distance between the opposing conductive plate and the ground plate is reduced (that is, the thinner the antenna device is). The horizontal direction of the antenna here refers to the direction from the center of the opposing conductive plate toward the edge thereof. The horizontal direction of the antenna corresponds to the side for the antenna device.

In view of the above points, an antenna device is provided to be capable of maintaining/improving the gain in the horizontal direction of the antenna in the antenna device which operates by parallel resonance of the capacitance formed between the ground plate and the opposing conductive plate and the inductance of the short-circuit portion.

In one aspect of the present embodiments, the antenna device includes: a ground plate that is a flat conductor member; an opposing conductive plate that is a flat conductor member installed at a predetermined distance from the ground plate and electrically connected to a power supply line; a short-circuit portion for electrically connecting the opposing conductive plate and the ground plate; and a radio wave shielding body for blocking the propagation of the electric field arranged on the upper side of the opposing conductive plate and made of a conductive material or a dielectric material. Using the inductance provided in the short-circuit portion and the electrostatic capacitance formed by the ground plate and the opposing conductive plate, parallel resonance occurs at a predetermined target frequency.

According to the above configuration, since the radio wave shielding body for shielding the radio waves is provided on the upper side of the opposing conductive plate, the vertical electric field radiated from the edge of the opposing conductive plate is restricted from wrapping around the upper side of the opposing conductive plate. That is, the radiation direction of the vertical electric field can be concentrated in the horizontal direction of the antenna. As a result, the gain in the horizontal direction of the antenna can be maintained or improved.

Hereinafter, an embodiment of the present disclosure will be described with reference to the drawings. In the following, members having the same function will be designated by the same reference numerals, and the description thereof will be omitted. When only a part of the configuration is described, the configuration described in the preceding embodiment can be applied to other parts.

Figure 2:
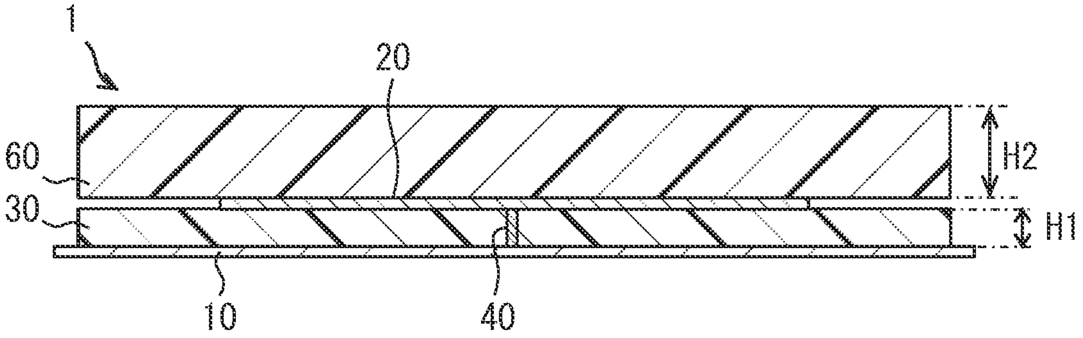
FIG. 2 is a cross-sectional view of the antenna device taken along line II-II in FIG. 1.

FIG. 1 is an exterior perspective view illustrating an example of a schematic structure of an antenna device 1 according to the present embodiment. FIG. 2 is a cross sectional view of the antenna device 1 along the line II-II illustrated in FIG. 1. The antenna device 1 is used by being mounted on a moving body such as a vehicle.

The antenna device 1 is configured to transmit and receive radio waves at a predetermined target frequency. Of course, as another mode, the antenna device 1 may be used for only either one of transmission and reception. Since transmission and reception of radio waves are reversible, a configuration capable of transmitting radio waves at a predetermined frequency is also similar to a configuration capable of receiving radio waves at the predetermined frequency.

Herein, the operating frequency is, for example, 2.4 GHz. Of course, the target frequency may be appropriately designed, and target frequencies may be, for example, 300 MHz, 760 MHz, 850 MHz, 900 MHz, 1.17 GHz, 1.28 GHz, 1.55 GHz, 5.9 GHz, or the like. The antenna device 1 can transmit and receive not only the target frequency but also radio waves having a frequency within a predetermined range determined with the target frequency as a reference. For example, the antenna device 1 is configured to be capable of transmitting and receiving frequencies belonging to the band from 2400 MHz to 2480 MHz (hereinafter, 2.4 GHz band). That is, the antenna device 1 can transmit and receive radio waves in frequency bands used in short-range wireless communication such as Bluetooth Low Energy (Bluetooth is a registered trademark), Wi-Fi (registered trademark), ZigBee (registered trademark), and the like. For convenience, a frequency band that enables the antenna device 1 to perform transmission and reception will be hereinafter also described as an operating band.

The antenna device 1 is connected with a wireless device that is not shown via, for example, a coaxial cable, and a signal received by the antenna device 1 is sequentially output to the wireless device. The antenna device 1 converts an electric signal input from the wireless device into a radio wave and emits the radio wave into space. The wireless device uses signals received by the antenna device 1, and also supplies high-frequency power corresponding to transmission signals to the antenna device 1.

In the present embodiment, description is made on the example that the antenna device 1 and the wireless device are connected by the coaxial cable, alternatively, another communication cable such as a feeder line may be used for connection. The antenna device 1 and the wireless device may be connected via a matching circuit, a filter circuit, or the like other than the coaxial cable. The antenna device 1 may be integrally configured with the wireless device. For example, the antenna device 1 may be realized on a printed circuit board on which a modulation/demodulation circuit or the like is mounted.

Hereinafter, a specific structure of the antenna device 1 will be described. As shown in FIGS. 1 and 2, the antenna device 1 includes a ground plate 10, an opposing conductive plate 20, a support portion 30, a short-circuit portion 40, a power supply line 50, and an upper shielding body 60. For convenience, each part will be described below with the side where the opposing conductive plate 20 is provided with respect to the ground plate 10 as the upper side for the antenna device 1. The direction from the opposing conductive plate 20 toward the ground plate 10 corresponds to the downward direction for the antenna device 1.

The ground plate 10 is a conductive member having a plate shape and made of conductor such as copper. The plate shape here also includes a thin film shape such as a metal foil. That is, the ground plane 10 may be a pattern formed on a surface of a resin plate such as a printed wiring board. The ground plate 10 is formed in a square shape. The length of one side of the ground plate 10 is set to a value corresponding to, for example, 1.1 times the wavelength of the radio wave of the target frequency (hereinafter, the target wavelength) electrically. In this case, the electrical length is an effective length in consideration of a fringing electric field, a wavelength shortening effect by a dielectric substance, and the like. The ground plate 10 is electrically connected to the external conductor of the coaxial cable and provides the ground potential (in other words, ground) in the antenna device 1.

The size of the ground plate 10 may be changeable as appropriate. For example, the ground plate 10 may have a square shape in which one side is electrically set to a value corresponding to one wavelength. The ground plate 10 may preferably have a size necessary for stable operation of the antenna device 1. As another aspect, the length of one side of the ground plate 10 may be electrically set to a value smaller than one wavelength (for example, one-third of the target wavelength). The wavelength of the 2.4 GHz radio wave (that is, the target wavelength) in vacuum and air is 125 mm.

Further, the shape of the ground plate 10 viewed from above (hereinafter referred to as a planar shape) may be appropriately changed. Here, as an example, the plane shape of the ground plate 10 is a square shape, alternatively, as another aspect, the plane shape of the ground plate 10 may be a rectangular shape or another polygonal shape. Alternatively, it may be a circular (including ellipse) shape. The ground plate 10 may be preferably formed to have a size larger than a circle having a diameter of one wavelength. The planar shape of a member refers to the shape of the member as viewed from above.

The opposing conductive plate 20 is a conductive member having a plate shape and made of conductor such as copper. As described above, the plate shape here also includes a thin film shape such as copper foil. The opposing conductive plate 20 is arranged so as to face the ground plate 10 via the support portion 30. Similar to the ground plate 10, the opposing conductive plate 20 may also have a pattern formed on the surface of a resin plate such as a printed wiring board. The term "parallel" here may not be limited to perfect parallel. The opposing conductive plate 40 may be inclined from several degrees to about ten degrees with respect to the ground plate 50. That is, the term "parallel" includes a substantially parallel state.

By arranging the opposing conductive plate 20 and the ground plate 10 so as to face each other, a capacitance is formed according to the area of the opposing conductive plate 20 and the distance between the opposing conductive plate 20 and the ground plate 10. The opposing conductive plate 20 is formed to have a size that forms a capacitance that resonates in parallel with the inductance of the short-circuit portion 40 at a target frequency. The area of the opposing conductive plate 20 may be appropriately designed to provide the desired capacitance (and thus to operate at the target frequency). For example, the opposing conductive plate 20 is formed in a square shape having a side of 14 mm. Of course, the length of one side of the opposing conductive plate 20 may be changed as appropriate, and may be 12.5 mm, 15 mm, 20 mm, 25 mm, or the like.

Here, the shape of the opposing conductive plate 20 is square as an example, alternatively, as another configuration, the planar shape of the opposing conductive plate 20 may be circular, regular octagon, regular hexagon, or the like. Further, the opposing conductive plate 20 may have a rectangular shape or an oblong shape. It may be preferable that the opposing conductive plate 20 has a line-symmetrical shape (hereinafter, a bi-directional line-symmetric shape) with each of two straight lines orthogonal to each other as axes of symmetry. The bidirectional line symmetrical shape refers to a figure that is line-symmetric with a first straight line as an axis of symmetry, and that is further line-symmetric with respect to a second straight line that is orthogonal to the first straight line. The bidirectional line symmetrical shape corresponds to, for example, an ellipse, a rectangle, a circle, a square, a regular hexagon, a regular octagon, a rhombus, or the like. It may be preferable that the opposing conductive plate 20 is a point-symmetrical figure such as a circle, a square, a rectangle, and a parallelogram.

The opposing conductive plate 20 may be provided with slits or may have rounded corners. For example, a notch as a degenerate separation element may be provided at a pair of diagonal portions. An edge portion of the opposing conductive plate 20 may be partially or entirely formed in a meander shape. The bidirectional line-symmetrical shape also includes a shape in which the edge portion of the bidirectional line-symmetrical shape is provided with irregularities. The same applies to the point-symmetrical shape.

The support portion 30 is a member for arranging the ground plate 10 and the opposing conductive plate 20 so as to face each other at a predetermined interval. The support portion 30 is realized by using a dielectric material such as resin. As a material for the support portion 30, Flame Retardant Type 4 (so-called FR4) or the like may also be adopted. Here, as an example, the support portion 30 is realized by using FR4 having a relative permittivity of 4.3.

In the present embodiment, as an example, the support portion 30 is formed as a plate-shaped member having a thickness of 1.5 mm. The support portion 30 corresponds to a support plate. The thickness H1 of the support portion 30 corresponds to the distance between the ground plate 10 and the opposing conductive plate 20. By adjusting the thickness H1 of the support portion 30, the distance between the opposing conductive plate 20 and the ground plate 10 can be adjusted. The specific value of the thickness H1 of the support portion 30 may be appropriately determined by simulations or experiments. The thickness H1 of the support portion 30 may be 2.0 mm, 3.0 mm, or the like. The wavelength of the support portion 30 is about 60 mm due to the wavelength shortening effect of the dielectric material. Therefore, the value of 1.5 mm in thickness electrically corresponds to 1/40 of the target wavelength.

The shape of the support portion 30 is not limited to a plate shape, as long as the support portion 30 fulfills the above-described function. The support portion 30 may be a plurality of pillars that support the ground plate 10 and the opposing conductive plate 20 so as to face each other at a predetermined interval. Further, in the present embodiment, a configuration in which a resin as a support portion 30 is filled is adopted between the ground plate 10 and the opposing conductive plate 20, alternatively, the present embodiment may not be limited to this. The space between the ground plate 10 and the opposing conductive plate 20 may be hollow or vacuum. In addition, the structures exemplified above may be combined. When the antenna device 1 is realized using a printed wiring board, a plurality of conductor layers included in the printed wiring board may be used as the ground plate 10 and the opposing conductive plate 20, and a resin layer separating the conductor layers may be used as the support portion 30.

The thickness H1 of the support portion 30 also functions as a parameter for adjusting a length of a short-circuit portion 40 (in other words, an inductance provided by the short-circuit portion 40), as described later. The interval H1 also functions as a parameter for adjusting the capacitance formed by the ground plate 10 and the opposing conductive plate 20 facing each other.

The short-circuit portion 40 is a conductive member that electrically connects the ground plate 10 and the opposing conductive plate 20. It is sufficient that the short-circuit portion 40 is provided by using a conductive pin (hereinafter, short-circuit pin). An inductance of the short-circuit portion 40 can be adjusted by adjusting a diameter and a length of the short-circuit pin serving as the short-circuit portion 40.

The short-circuit portion 40 may be a linear member having one end electrically connected to the ground plate 10 and the other end electrically connected to the opposing conductive plate 20. When the antenna device 1 is realized using a printed wiring board as a base material, a via hole provided on the printed wiring board can be used as the short-circuit portion 40.

The short-circuit portion 40 is provided so as to be located at the center of the opposing conductive plate 20 (hereinafter, the center of the conductor plate). The center of the conductor plate corresponds to the center of gravity of the opposing conductive plate 20. Since the opposing conductive plate 20 has a square shape in the present embodiment, the center of the conductor plate corresponds to the intersection of two diagonal lines of the opposing conductive plate 20. Note that a position where the short-circuit portion 40 is formed may not always exactly coincide with the center of the opposing conductive plate 40. The short-circuit portion 40 may be deviated from the center of the conductor plate by about several millimeters. The short-circuit portion 40 may be formed in a center region of the opposing conductive plate 20. The central region of the opposing conductive plate 20 refers to a region inside the line connecting the points that internally divide the conductor plate from the center to the edge portion in a ratio of 1:5. From another point of view, the central region corresponds to a region where concentric figures, in which the opposing conductive plate 20 is similarly reduced to about ⅙, overlap.

The power supply line 50 is a microstrip line provided on the patch side surface of the support portion 30 in order to supply power to the opposing conductive plate 20. One end of the power supply line 50 is electrically connected to the inner conductor of the coaxial cable, and the other end is electrically connected to the edge of the opposing conductive plate 20. The connecting portion between the power supply line 50 and the opposing conductive plate 20 corresponds to a power supply point for the opposing conductive plate 20. An electric current input to the power supply line 50 via the coaxial cable propagates to the opposing conductive 20 and excites and vibrates the opposing conductive plate 20. At the edge of the opposing conductive plate 20, the point connected to the power supply line 50 corresponds to the power supply point.

In this embodiment, as the power supply method for the opposing conductive plate 20, a direct connection power supply method in which the power supply line 50 is directly connected to the opposing conductive plate 20 is adopted, alternatively, the present embodiment may not be limited to this feature. As another embodiment, a power supply method in which the power supply line 50 and the opposing conductive plate 20 are electromagnetically coupled may be adopted. The direct power supply method may be realized by using a conductive pin or a via. The position of the power supply point may be a position where the impedance matches. The power supply point may be arranged at an arbitrary position, for example, in the central region of the opposing conductive plate 20.

The upper shield body 60 is made of a plate-shaped dielectric material arranged on the upper side of the opposing conductive plate 20. In the present embodiment, as an example, the vertical and horizontal dimensions (in other words, the planar shape) of the upper shield body 60 are formed to be the same as those of the support portion 30. The thickness H2 of the upper shield body 60 is, for example, 3 mm. The upper shield body 60 is arranged on the opposing conductive plate 20 so as to cover the upper surface portion of the opposing conductive plate 20 (in other words, so as to be in contact with the plate 20).

The upper shield body 60 is configured to prevent a vertical electric field generated from an end portion of the opposing conductive plate 20 from wrapping around to the upper side of the opposing conductive plate 20, as will be described later. The upper shield body 60 corresponds to a radio wave blocking body. The blocking body here is ideally configured to reflect radio waves, alternatively, it may not be limited to this feature. A configuration that suppresses (in other words, inhibits) the propagation of radio waves corresponds to a configuration that shields the propagation of radio waves. It may be preferable that the upper shield body 60 is configured so as to be in contact with the edge portion of the opposing conductive plate 20 and to have a predetermined height.

As the material of the upper shield body 60, various dielectrics such as resin, glass, and ceramics can be adopted. For example, the upper shield body 60 is realized by using a ceramic having a relative permittivity of 50 or more. For example, the upper shield body 60 is made of a ferroelectric substance such as barium titanate ($BaTiO_3$) or lead zirconate titanate. The upper shield body 60 may be made of a normal dielectric such as barium titanate ($BaTiO_2$), titanium oxide ($TiO_2$) or calcium zirconate ($CaZrO_3$). Here, the upper shield body 60 may be realized by using polycarbonate, ABS resin, or the like. As the material of the upper shield body 60, various resin materials such as urethane resin, epoxy resin, and silicon can be adopted.

When the dielectric dissipation factor of the upper shield body 60 is high, the amount of radiant energy lost as heat loss increases. Therefore, it may be preferable that the upper shield body 60 is realized by using a material having a smaller dielectric loss tangent. Further, the upper shield body 60 acts so as to suppress the wraparound of the electric field as the dielectric constant increases. In other words, the higher the dielectric constant of the upper shield body 60, the better the gain improving effect in the horizontal direction of the antenna. Therefore, it may be preferable that the material of the upper shield body 60 is realized by using a dielectric having a high dielectric constant. In addition, the upper shield body 60 may be configured by using a metal (that is, a conductor) as described later as a modification.

<Operating Principle of the 0th-Order Resonant Antenna>

Figure 3:
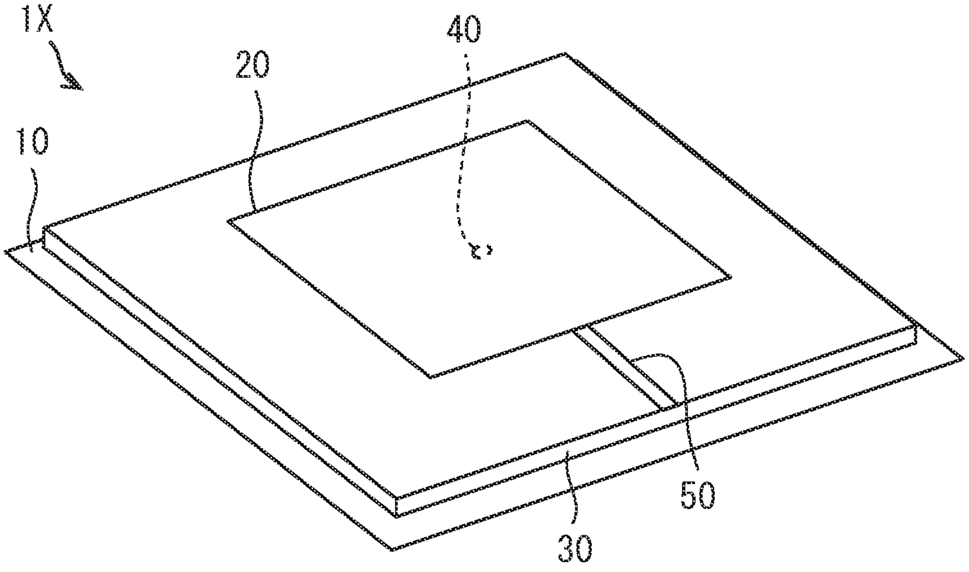
FIG. 3 is a diagram showing a basic configuration (that is, a comparative configuration) of a 0th-order resonant antenna.

Next, the antenna device 1X as a comparative configuration (in other words, a basic configuration) of the 0th-order resonant antenna is prepared, and the operating principle of the 0th-order resonant antenna will be described. The antenna device 1X corresponds to a comparative configuration for the antenna device 1 of the present embodiment. As shown in FIG. 3, the antenna device 1X as a basic 0th-order resonant antenna includes a ground plate 10, an opposing conductive plate 20, a support portion 30, a short-circuit portion 40, and a power supply line 50. That is, the antenna device 1X as the comparative configuration corresponds to the configuration in which the upper shield body 60 is removed from the antenna device 1 of the present embodiment.

Although the basic operating principle of the 0th-order resonant antenna is described here, the antenna device 1 of the present embodiment (hereinafter, also referred to as a proposed configuration) operates on the same principle. That is, the description of the antenna device 1X can be generally applied to the antenna device 1. Further, the operation when the comparative configuration transmits (i.e., radiates) radio waves and the operation when receiving radio waves have reversibility with each other. Therefore, here, only the operation when radiating radio waves will be described, and the description of the operation when receiving radio waves will be omitted.

The 0th-order resonant antenna disclosed as the antenna device 1X is generally operated by LC parallel resonance of the capacitance formed between the ground plate 10 and the opposing conductive plate 20 and the inductance provided in the short-circuit portion 40. Specific examples are as follows. The opposing conductive plate 20 in the antenna device 1X is short-circuited to the ground plate 10 by a short-circuit portion 40 provided in the center region of the opposing conductive plate 20, and the area of the opposing conductive plate 20 is equal to an area for forming an electrostatic capacitance that resonates in parallel with the inductance of the short-circuit portion 40 at the target frequency. Therefore, parallel resonance occurs due to energy exchange between the inductance and the capacitance, and an electric field perpendicular to the ground plate 10 (and the opposing conductive plate 20) is generated between the ground plate 10 and the opposing conductive plate 20. This vertical electric field propagates from the short-circuit portion 40 toward the edge portion of the opposing conductive plate 20, and at the edge portion of the opposing conductive plate 20, the vertical electric field becomes vertically polarized and propagates in space. The vertically polarized wave here refers to a radio wave in which the vibration direction of the electric field is perpendicular to the ground plate 10 and the opposing conductive plate 20.

Figure 4:
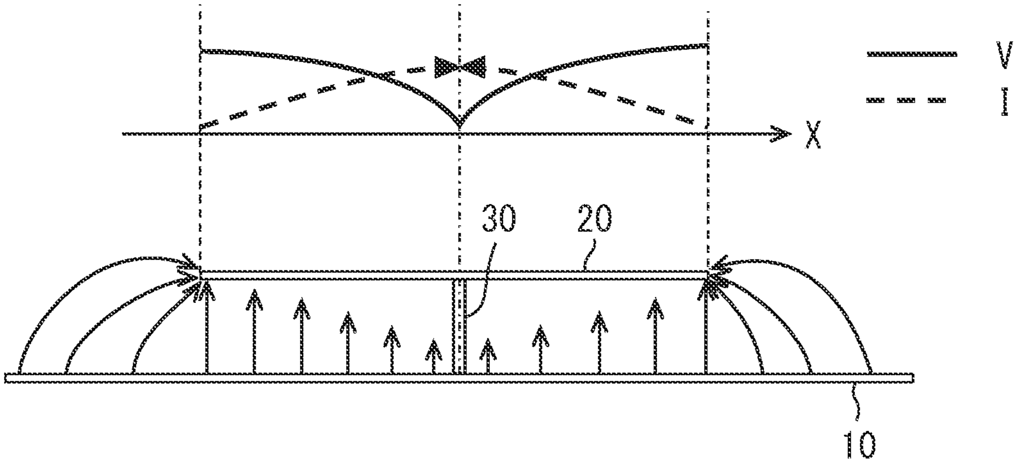
FIG. 4 is a diagram for explaining the operating principle of the 0th-order resonant antenna.

Since the propagation direction of the vertical electric field is symmetrical with respect to the short-circuit portion 40 as shown in FIG. 4, it has the same gain in all directions in the horizontal plane of the antenna. In other words, at the target frequency, the antenna device 1 and the antenna device 1X have a directivity in all directions (that is, an antenna horizontal direction) from the center region toward the edge of the opposing conductive plate 20. Therefore, when the ground plate 10 is disposed so as to be horizontal, the antenna device 1 has the directivity in the horizontal plane direction. The horizontal plane of the antenna here refers to a plane parallel to the ground plate 10 and the opposing conductive plate 20. The horizontal direction of the antenna here refers to the direction from the center of the opposing conductive plate 20 toward the edge thereof. According to another viewpoint, the antenna horizontal direction refers to a direction perpendicular to a perpendicular line to the ground plate 10 passing through the center of the opposing conductive plate 20. The antenna horizontal direction corresponds to a lateral direction (e.g., the side direction) of the antenna device.

Since the current flowing through the opposing conductive plate 20 is symmetrical about the short-circuited portion 40, the radio waves in the antenna height direction generated by the current flowing in a certain traverse are canceled by the radio waves generated by the current flowing in the opposite direction. Therefore, it does not radiate radio waves in the height direction of the antenna.

<Effect of Antenna Device 1 (Mainly Arrangement of Upper Shield Body)>

Figure 5:
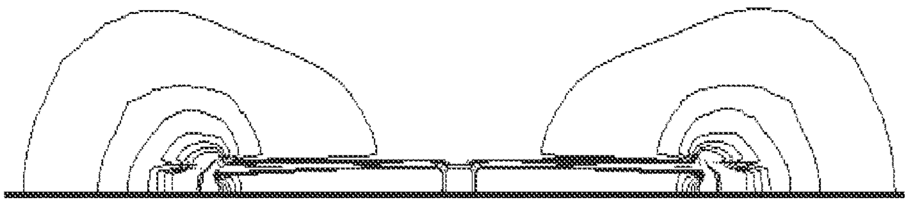
FIG. 5 is a diagram showing an intensity distribution of a vertical electric field in a comparative configuration.

Next, the effect/advantage of this embodiment on the comparative configuration will be described. When the inventors verify the operation mode of the comparative configuration as a conceivable 0th-order resonant antenna, in the comparative configuration, as shown in FIG. 5, the vertical electric field wraps around the upper side of the opposing conductive plate 20, and the radiation intensity (i.e., the gain) of the radio wave in the horizontal direction of the antenna is impaired. It is also found that the above tendency becomes more remarkable as the distance H1 between the ground plate 10 and the opposing conductive plate 20 becomes smaller. That is, in the comparative configuration, the smaller the distance H1 between the ground plate 10 and the opposing conductive plate 20, the smaller the gain in the horizontal direction of the antenna.

Figure 6:
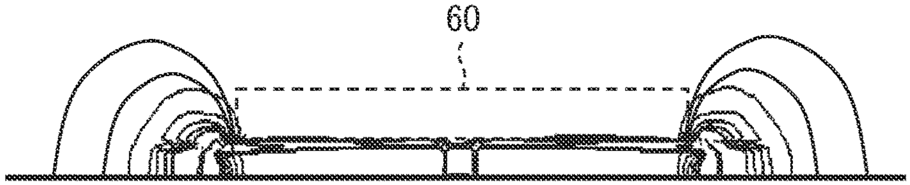
FIG. 6 is a diagram for describing effects of the present embodiment.
Figure 7:
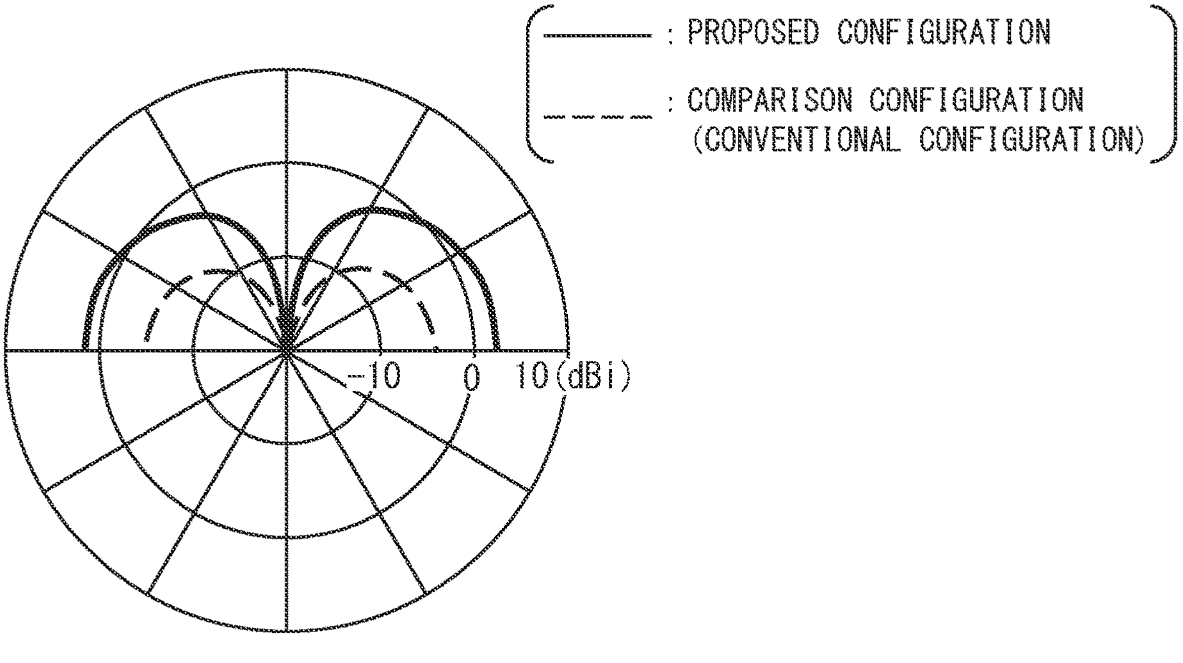
FIG. 7 is a diagram showing a gain in the horizontal direction of an antenna having a comparative configuration and the antenna device of the present embodiment.

In response to such a difficulty, the configuration of the present embodiment includes a dielectric member covering the edge of the opposing conductive plate 20 as the upper shield body 60. Since the upper shield body 60 is configured by using a dielectric member having a predetermined dielectric constant, it is possible to prevent the vertical electric field from wrapping around to the upper side of the opposing conductive plate 20 as shown in FIG. 6. As a result, as shown in FIG. 7, the gain in the horizontal direction of the antenna can be increased.

Figure 8:
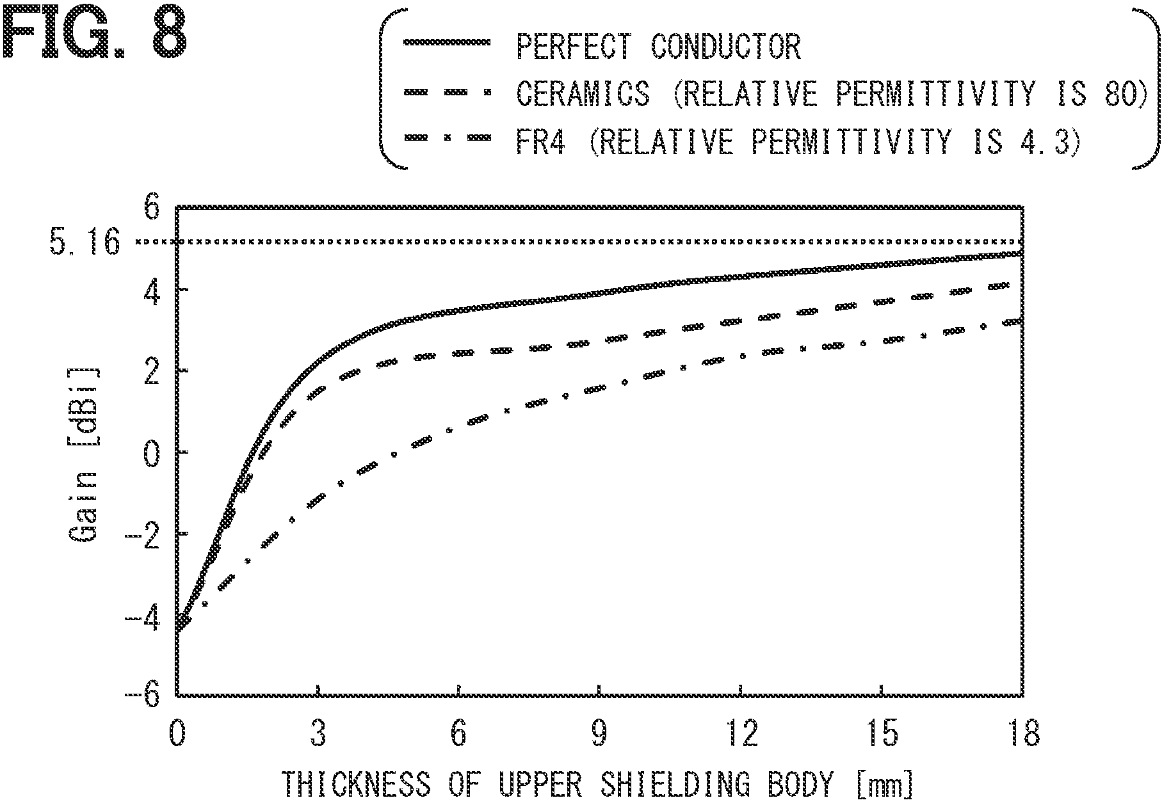
FIG. 8 is a diagram showing a result of simulating the relationship between the thickness of the upper shielding body, the material, and the gain.

As described above, as the material of the upper shield body 60, in addition to ceramic, a resin, a conductor, or the like can be adopted. FIG. 8 is a diagram showing the results of testing the relationship between the material of the upper shield body 60, the thickness H2, and the gain in the horizontal direction of the antenna. When the upper shield body 60 is made of ceramic as shown in FIG. 8, a gain of approximately 2 dB or more can be obtained by setting the thickness H2 to about 3 mm. Further, as the thickness H2 of any material is increased, the gain in the horizontal direction of the antenna approaches the theoretical value of the gain of the monopole antenna having a ¼ wavelength. The theoretical value of the gain of the ¼ wavelength monopole antenna is 5.16 dBi.

Further, when a perfect conductor (that is, metal) or ceramic is used as the material of the upper shield body 60, it can be seen that a gain close to that of the monopole antenna can be obtained by setting the thickness H2 to 18 mm. In addition, since the wavelength of 2.4 GHz in the air is 125 mm, the height of the ¼ wavelength monopole antenna needs to be about 31.3 mm. On the other hand, according to the configuration of the present disclosure, a gain equivalent to that of a ¼ wavelength monopole antenna is obtained at a height of about 18 mm (that is, about 60% of the height of a ¼ wavelength monopole antenna). That is, according to the configuration of the present embodiment, the height of the antenna device 1 can be suppressed. The configuration in which the thickness H2 is 18 mm is closer to a block shape than a plate shape. Since the difference between the plate shape and the block shape is ambiguous, the plate shape here also includes the block shape.

The embodiment of the present disclosure has been described above. The present disclosure should not be limited to the above embodiment, but has a technical scope including various modifications to be described hereinafter and can also be implemented with various changes not described below within a scope not departing from the purpose of the present disclosure. For example, various modifications to be described below can be implemented in appropriate combination within a scope that does not cause technical inconsistency.

Modification 1

Figure 9:
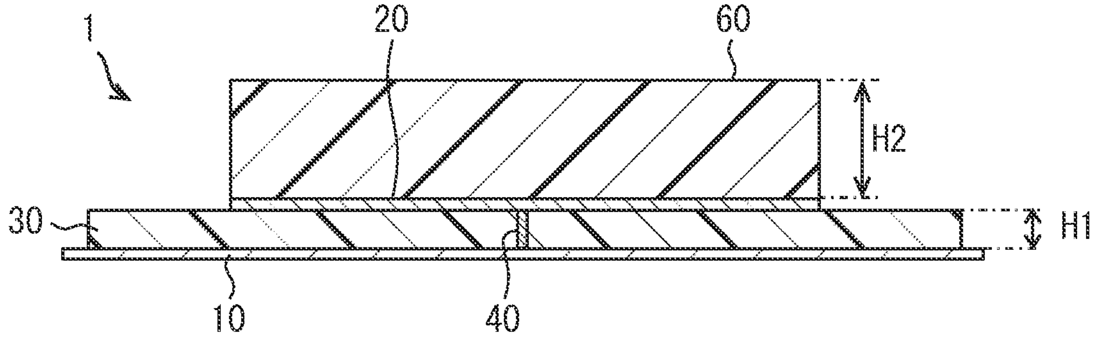
FIG. 9 is a diagram showing a modified example of the upper shielding body.

The upper shield body 60 may be made of metal (that is, a conductor) as shown in FIG. 9. This configuration corresponds to a configuration in which a conductor is put up at the end of the opposing conductive plate 20. Since the conductor reflects radio waves, it suppresses the wraparound (in other words, propagation) of radio waves more than the dielectric material. Therefore, when the upper shield body 60 is realized by using a conductor, the gain in the horizontal direction of the antenna can be increased as compared with the configuration in which the upper shield body 60 is realized by using a dielectric material.

Further, according to the configuration in which the upper shield body 60 is made of a conductor, a current flows on the vertical surface of the upper shield body 60. Since the current flowing in the vertical plane of the upper shield body 60 affects to radiate the vertically polarized waves in the horizontal direction of the antenna, the gain in the horizontal direction of the antenna can be further improved as compared with the above-described embodiment.

However, the configuration in which the upper shield body 60 is realized by using a conductor is inferior in robustness with respect to dimensional error and the like as compared with the configuration in which the upper shield body 60 is realized by using a dielectric material such as ceramic. For example, when the metal upper shield body 60 protrudes to the outside of the opposing conductive plate 20, the target frequency may change significantly. This is because the portion of the metal upper shield body 60 protruding from the opposing conductive plate 20 forms a capacitance with the ground plate 10. For example, in a configuration in which the distance between the ground plate 10 and the opposing conductive plate 20 is 1.5 mm and the relative permittivity of the support portion 30 is 4.3, when the upper shield body 60 protrudes by 1 mm from the edge portion of the opposing conductive plate 20, the capacitance that contributes to parallel resonance increases, and the operating frequency shifts to the low frequency side by nearly 1 GHz. More specifically, the operating frequency shifts from 2.4 GHz to 1.5 GHz.

On the other hand, according to the configuration in which the upper shield body 60 is made of a dielectric material, even if the upper shield body 60 protrudes about 1 mm outside the opposing conductive plate 20, the amount of increase in capacitance is negligible. Therefore, according to the configuration in which the upper shield body 60 is realized by using a dielectric material such as ceramic, it is possible to suppress the influence of the mounting error and the dimensional error of the upper shield body 60 on the operating frequency.

Here, the metal upper shield body 60 may be integrally formed with the opposing conductive plate 20. Further, it may be preferable that the upper shield body 60 is in contact with the opposing conductive plate 20, alternatively, in another embodiment, the upper shield body 60 is arranged on the upper side of the opposing conductive plate 20 at a predetermined interval. The upper shield body 60 may be preferably arranged on the upper side of the edge portion of the opposing conductive plate 20 so that the distance from the edge portion is 1/10 wavelength or less.

Further, it may be preferable that the vertical surface of the upper shield body 60 is formed at a position where the vertical surface thereof is in contact with the edge portion of the opposing conductive plate 20, alternatively, in another embodiment, the vertical surface of the upper shield body 60 has the vertical surface at a position inside a predetermined amount (for example, about several millimeters) from the edge of the opposing conductive plate 20. That is, the planar shape of the upper shield body 60 may be formed smaller than that of the opposing conductive plate 20.

Second Modification

Figure 10:
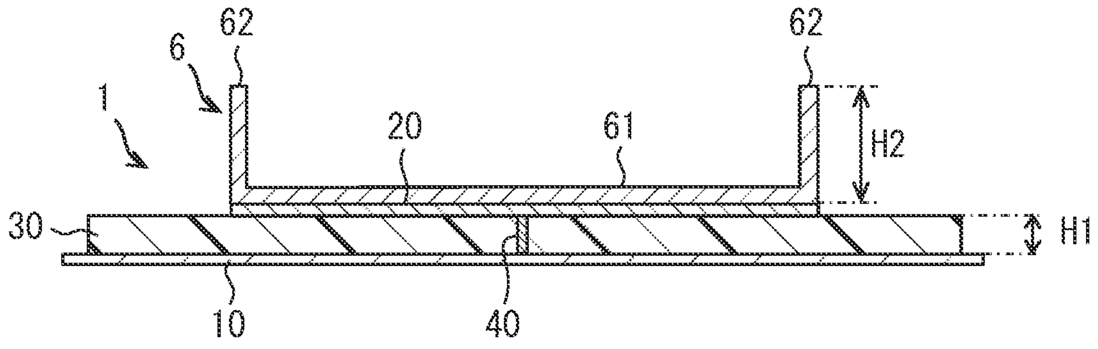
FIG. 10 is a diagram showing a modified example of the upper shielding body.

When the upper shield body 60 is made of a conductor, the upper shield body 60 may be formed on the upper side of the edge portion of the opposing conductive plate 20. The conductor as the upper shield body 60 may not always be formed above the central region of the opposing conductive plate 20. For example, as shown in FIG. 10, the conductor as the upper shield body 60 may be formed in a box shape in which the upper surface is open. The upper shield body 60 corresponds to a configuration including a shield body bottom portion 61 arranged on the upper surface of the opposing conductive plate 20 and an upright portion 62 standing upright on the edge portion of the opposing conductive plate 20. The shield bottom portion 61 corresponds to a configuration in which it is arranged to face the opposing conductive plate 20. The shield bottom portion 61 may be formed to have the same dimensions as the opposing conductive plate 20. The upright portion 62 may be tilted by about 15 degrees with respect to the opposing conductive plate 20. The expression "upright" also includes a mode in which the object is tilted by about 15 degrees from a truly right-angled state.

The metal upper shield body 60 only needs to have an upright portion 62, and the shield body bottom portion 61 may not be an essential element. In the configuration in which the shield bottom portion 61 of the upper shield body 60 is removed from the upper shield body 60 shown in FIG. 10, the configuration corresponds to the frame-shaped/tubular configuration having a predetermined thickness H2 (in other words, height or depth) so as to arrange the upper shield body 60 along the edge of the opposing conductive plate 20. Further, the metal upper shield body 60 may be integrally formed with the opposing conductive plate 20. The opposing conductive plate 20 may also be used as the shield bottom portion 61. The metal upright portion 62 provides a function of expanding the radiation area of the vertical electric field.

Figure 11:
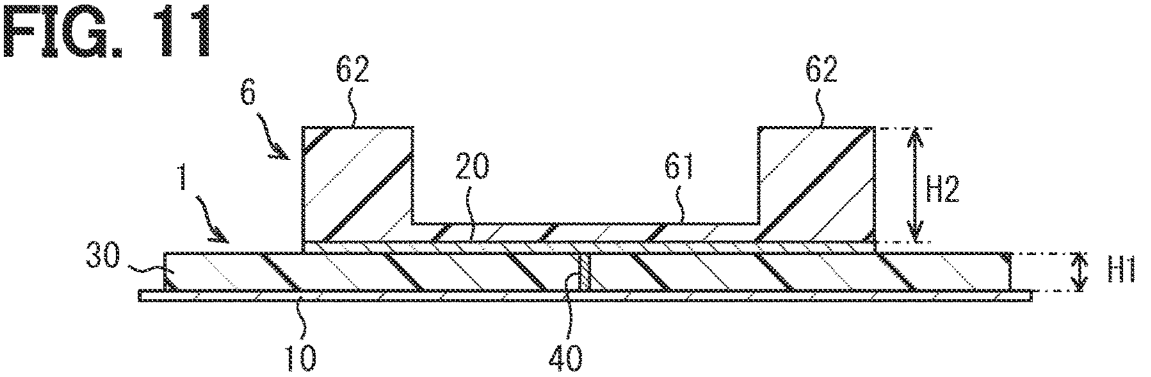
FIG. 11 is a diagram showing a modified example of the upper shielding body.

The configuration disclosed as the second modification can also be applied to the above-described embodiment. For example, as shown in FIG. 11, the ceramic/resin as the upper shield body 60 may be formed in a flat (in other words, shallow bottom) box shape having an open upper surface. Here, dielectrics are not as good as metals in shielding radio waves. Therefore, it may be preferable that the upright portion 62 configured by using a dielectric material has a thickness and a height capable of sufficiently blocking the wraparound of radio waves. For example, the dielectric material as the upright portion 62 may preferably have a thickness of at least about 2 mm to 5 mm. The specific thickness and height of the upright portion 62 made of a dielectric material may be appropriately designed based on simulation or the like. The upper shield body 60 may fulfill the above-mentioned function, and the shape of the upper shield body 60 may not be limited to a plate shape. The upper shield body 60 may have a flat plate shape including a block shape, a box shape, or a tubular shape.

Third Modified Example

Figure 12:
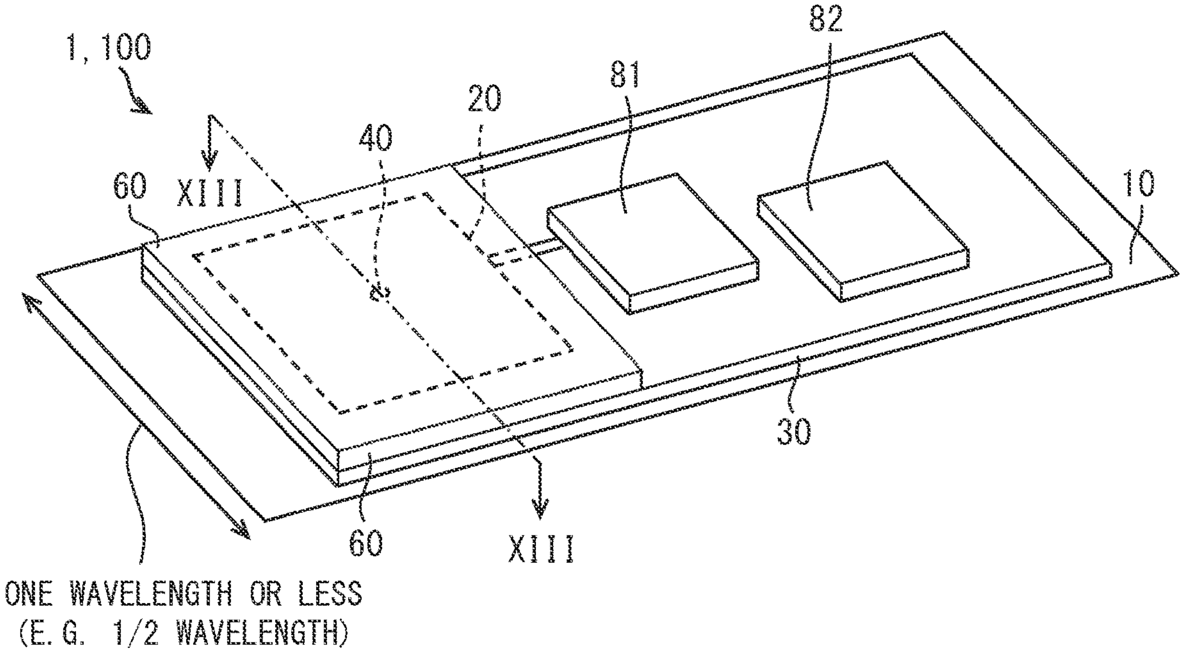
FIG. 12 is a diagram showing an example of a configuration in which an antenna device is mounted on a circuit board.
Figure 13:
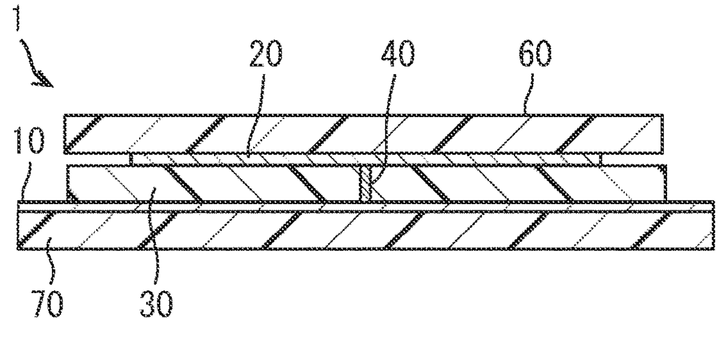
FIG. 13 is a view showing a cross section taken along line XIII-XIII shown in FIG. 12.

When the length (in other words, the width) of the ground plate 10 in a certain direction becomes one wavelength or less (particularly 0.7 wavelength or less), an electric field wraps around below the ground plate 10 and causes a decrease in gain. For example, as shown in FIG. 12, when the ground plate 10 has a rectangular shape and the length of the short side is electrically 0.5 wavelength, a vertical electric field may wrap around below the ground plate 10. In view of such circumstances, when the length of the ground plate 10 in a certain direction is formed to be 1 wavelength or less (particularly 0.7 wavelength or less), as shown in FIG. 13, it may be preferable that a dielectric member or a conductor for blocking the propagation of the electric field is added as the lower shield body 70 located below the ground plate 10.

Similar to the upper shield body 60, the lower shield body 70 is configured to suppress the wraparound of radio waves. The lower shield body 70 may be preferably formed so as to cover the entire lower side surface of the ground plate 10. According to the configuration in which the lower shield body 70 is provided on the lower side of the ground plate 10, it is possible to reduce the possibility that the gain in the horizontal direction of the antenna is impaired due to the vertical electric field wrapping around the lower side of the ground plate 10. Regarding the material and shape of the lower shield body 70, the description of the upper shield body 60 can be referred to.

The lower shield body 70 may be in contact with the ground plate 10 or may be arranged to face each other so as to have a predetermined interval. In the above, the case where the ground plate 10 is rectangular has been described, alternatively, the technical idea disclosed as this modification can be applied to the case where the ground plate 10 is elliptical, circular, or regular polygon. For example, when the ground plate 10 has an elliptical shape, it may be preferable that the lower shield body 70 is arranged when the length of the minor axis of the ground plate 10 is one wavelength or less. When the length in the direction in which the length becomes the smallest among the lengths in the various directions passing through the point of the ground plate 10 overlapping the center of the opposing conductive plate is one wavelength or less, it may be preferable that the lower shield body 70 is arranged.

Reference numerals 81 and 82 shown in FIG. 12 indicate electronic components for realizing the modulation/demodulation circuit. The printed circuit board on which the opposing conductive plate 20, the ground plate 10, the modulation/demodulation circuit, and the like are mounted corresponds to the support portion 30 described above. Hereinafter, the printed circuit board on which the opposed conductive plate 20, the ground plate 10, the modulation/demodulation circuit, and the like are mounted will be referred to as a circuit board 100. The circuit board 100 corresponds to a module that provides a function as an antenna device 1.

Fourth Modified Example

Figure 14:
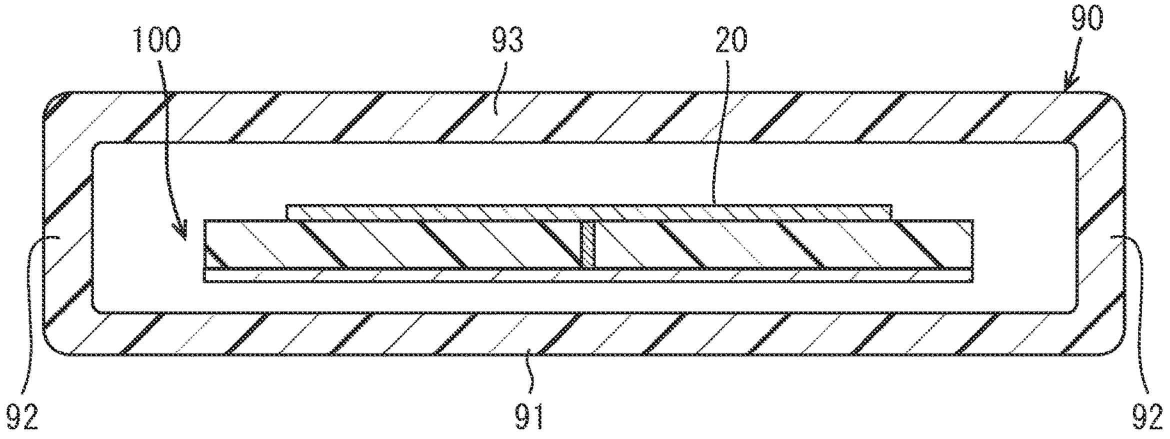
FIG. 14 is a diagram showing a configuration of an antenna device 1 including a case.

As shown in FIG. 14, the antenna device 1 may include a case 90 for accommodating the circuit board 100. The case 90 is formed by combining, for example, an upper case and a lower case that are vertically separable. The case 90 is constructed using, for example, a polycarbonate (PC) resin. As the material of the case 90, various resins such as synthetic resin obtained by mixing acrylonitrile-butadiene-styrene copolymer (so-called ABS) with PC resin and polypropylene (PP) can be adopted. The case 90 includes a case bottom portion 91, a case side wall portion 92, and a case top plate portion 93. The case bottom portion 91 is configured to provide the bottom of the case 90. The case bottom portion 91 is formed in a flat plate shape. In the case 90, the circuit board 100 is arranged so that the ground plate 10 faces the case bottom portion 91. The distance between the case bottom portion 91 and the ground plate 10 may be preferably set to $\lambda/25$ or less.

The case side wall portion 92 is configured to provide the side surface of the case 90, and is put up from the edge portion of the case bottom portion 91 upwardly. The height of the case side wall portion 92 is designed so that, for example, the distance between the inner surface of the case top plate portion 93 and the opposing conductive plate 20 is $\lambda/25$ or less. The case top plate portion 93 is configured to provide an upper surface portion of the case 90. The case top plate portion 93 of this embodiment is formed in a flat plate shape. As the shape of the case top plate portion 93, various other shapes such as a dome shape can be adopted. The case top plate portion 93 is configured such that the inner surface faces the upper surface of the support portion 30 (and thus the opposing conductive plate 20).

When the case top plate portion 93 is disposed near the opposing conductive plate 20 as in the above configuration, the case top plate portion 93 may also function as the above-mentioned upper shield body 60. The term "near the opposing conductive plate 20" refers to, for example, a region in which the distance from the opposing conductive plate 20 is electrically 1/25 or less of the target wavelength. The above configuration corresponds to a configuration in which the case top plate portion 93 is used as the upper shield body 60. Further, when the case bottom portion 91 is arranged near the ground plate 10 as in the above configuration, the case bottom portion 91 may also function as the above-mentioned lower shield body 70. The term "near the ground plate 10" means, for example, a region where the distance from the ground plate 10 is electrically 1/25 or less of the target wavelength. The lower shield body 70 may be realized by using the case bottom portion 91.

Figure 15:
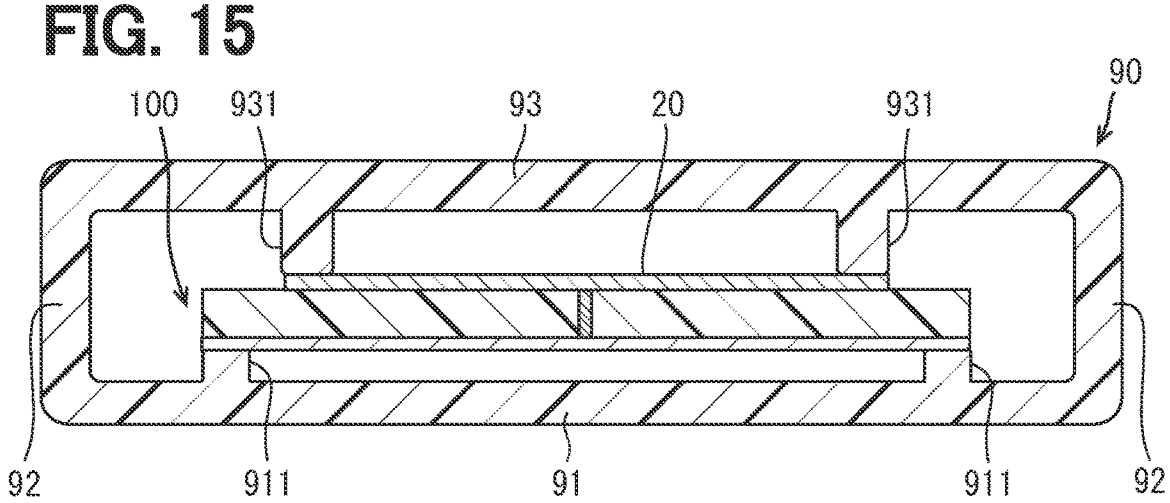
FIG. 15 is a diagram showing a modified example of the case.

The case 90 may be formed with an upper rib 931 for supporting and positioning the circuit board 100. The upper rib 931 has a convex structure formed downward from a predetermined position on the inner surface of the case top plate portion 93. The upper rib 931 is integrally formed with the case 90. The upper rib 931 regulates the position of the support portion 30 in the case 90. As shown in FIG. 15, the upper rib 931 may be preferably provided so as to be in contact with the edge portion of the opposing conductive plate 20. According to the configuration in which the upper rib 931 is arranged so as to be in contact with the edge portion of the opposing conductive plate 20, the upper rib 931 also functions as the upper shield body 60 (specifically, the upright portion 62). Therefore, the gain in the horizontal direction of the antenna can be increased as compared with the configuration without the upper rib 931. The upper rib 931 formed so as to come into contact with the edge portion of the opposing conductive plate 20 corresponds to the edge portion contact portion. A metal pattern such as copper foil may be arranged to the vertical surface (that is, the outer surface) of the upper rib 931 that is connected to the edge of the opposing conductive plate 20. According to this configuration, substantially the same effect as that of the configuration in which the upright portion 62 made of a conductor is added can be obtained.

A lower rib 911 for supporting and positioning the circuit board 100 may be formed on the case bottom portion 91. The lower rib 911 has a convex structure integrally formed from a predetermined position of the case bottom portion 91 toward the upper side. The lower rib 911 provides to regulate the position of the circuit board 100 in the case 90. The lower rib 911 is formed so that the distance between the ground plate 10 and the case bottom portion 91 is $\lambda/25$ or less. The lower rib 911 may be preferably formed so as to be in contact with the edge portion of the ground plate 10. According to this configuration, the lower rib 911 also functions as the lower shield body 70. Therefore, the gain in the horizontal direction of the antenna can be increased as compared with the configuration in which the lower rib 911 is not formed. The lower rib 911 corresponds to the lower support portion. A metal pattern such as copper foil may be arranged to the vertical surface (that is, the outer surface) of the lower rib 911 that is connected to the edge of the ground plate 10.

Fifth Modification

As illustrated in FIG. 12, the antenna device 1 including the opposing conductive plate 20 and the like may be integrally formed on the circuit board 100 on which the modulation/demodulation circuit and the like are mounted. The circuit board 100 is housed in a case 90 and used from the viewpoint of waterproofness and the like.

Figure 16:
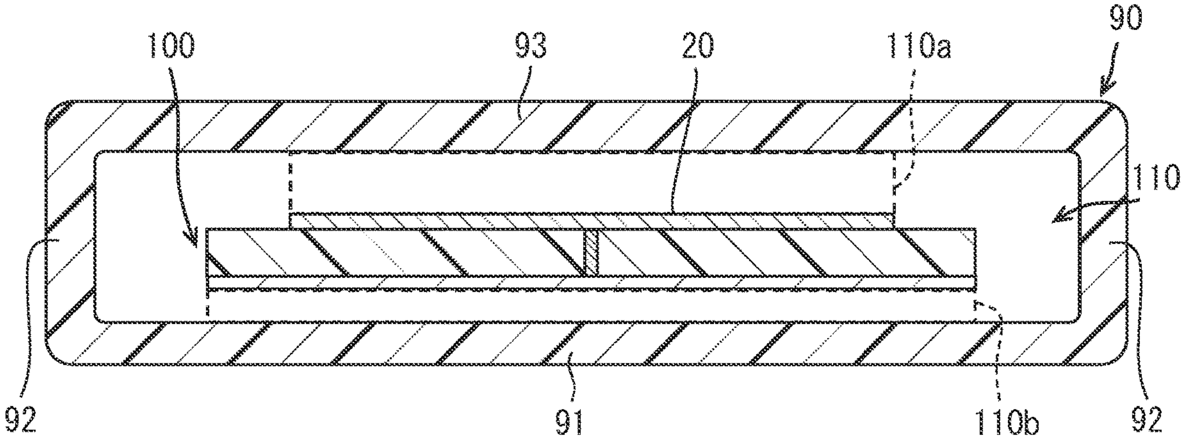
FIG. 16 is a diagram showing an antenna device in which a sealing material is filled in a case.

When the antenna device 1 includes the case 90, it may be preferable to fill the space between the case 90 and the circuit board 100 with a sealing material 110 such as silicon as shown only by reference numerals in FIG. 16. The sealing material 110 corresponds to a sealing member. In FIG. 16, hatching of the sealing material 110 is not shown in order to maintain the visibility of the drawing. The same applies to FIG. 17. According to the configuration in which the case 90 is filled with the sealing material 110, the sealing material 110 (i.e., the portion shown by 110*a* in FIG. 16) located above the opposing conductive plate 20 can function as the upper shield body 60. Even when the sealing material 110 is filled on the upper side of the opposing conductive plate 20, the case top plate portion 93 can function as a part of the upper shield body 60. The upper shield body 60 may be realized by combining the sealing material 110 located above the opposing conductive plate 20 and the case top plate portion 93. Further, according to the configuration in which the sealing material 110 is filled in the case 90, waterproofness, dustproofness, and vibration resistance can be improved. From another point of view, such a configuration corresponds to a configuration in which the sealing material 110 for waterproofing purposes such as silicon also provides the upper shield body 60.

Further, the sealing material 110 (i.e., the portion shown by 110*b* in FIG. 16) located below the ground plate 10 can function as the lower shield body 70 referred to in the modified example 3. That is, according to the configuration in which the sealing material 110 is filled in the case 90, the sealing material 110 functions as the upper shield body 60 and the lower shield body 70, so that both the waterproof property and the gain improvement in the horizontal direction of the antenna can be obtained. Even when the sealing material 110*a* is filled, the case bottom portion 91 can function as a part of the lower shield body 70. The configuration in which the sealing material 110 is filled in the case 90 corresponds to the configuration in which the lower shield body 70 is realized by the combination of the sealing material 110 located below the ground plate 10 and the case bottom portion 91.

As the sealing material 110, a urethane resin such as polyurethane prepolymer can be used. Here, as the sealing material 110, various other materials such as epoxy resin and silicone resin can be adopted. The configuration disclosed as the modification 5 may be implemented in combination with the modification 4. Specifically, the case 90 of the antenna device 1 shown in FIG. 16 may include an upper rib 931 and a lower rib 911 formed so as to be in contact with the edge portion of the opposing conductive plate 20.

Generally, the circuit board 100 includes electronic components 81 and 82 such as IC chips and three-dimensional structures such as connectors. Further, usually, a space is provided between the printed circuit board and the case so that the three-dimensional structures do not interfere with the case 90. Therefore, a separation may occur between the inner side surface of the case top plate portion 93 and the opposing conductive plate 20. As a matter of course, the larger the distance between the inner surface of the case top plate portion 93 and the opposing conductive plate 20, the more difficult it is for the case top plate portion 93 to function as the upper shield body 60.

The configuration disclosed as the present modification 5 is made by paying attention to the above-mentioned difficulties, and the directivity in the horizontal direction of the antenna is improved by filling the inside of the case 90 with a sealing material 110 such as silicon. As the sealing material, as described in the description of the upper shield body 60, a material having a high relative permittivity and a small dielectric loss tangent may be preferable. For example, it may be preferable that the relative permittivity is 2.0 or more and the dielectric loss tangent is 0.03 or less.

Figure 17:
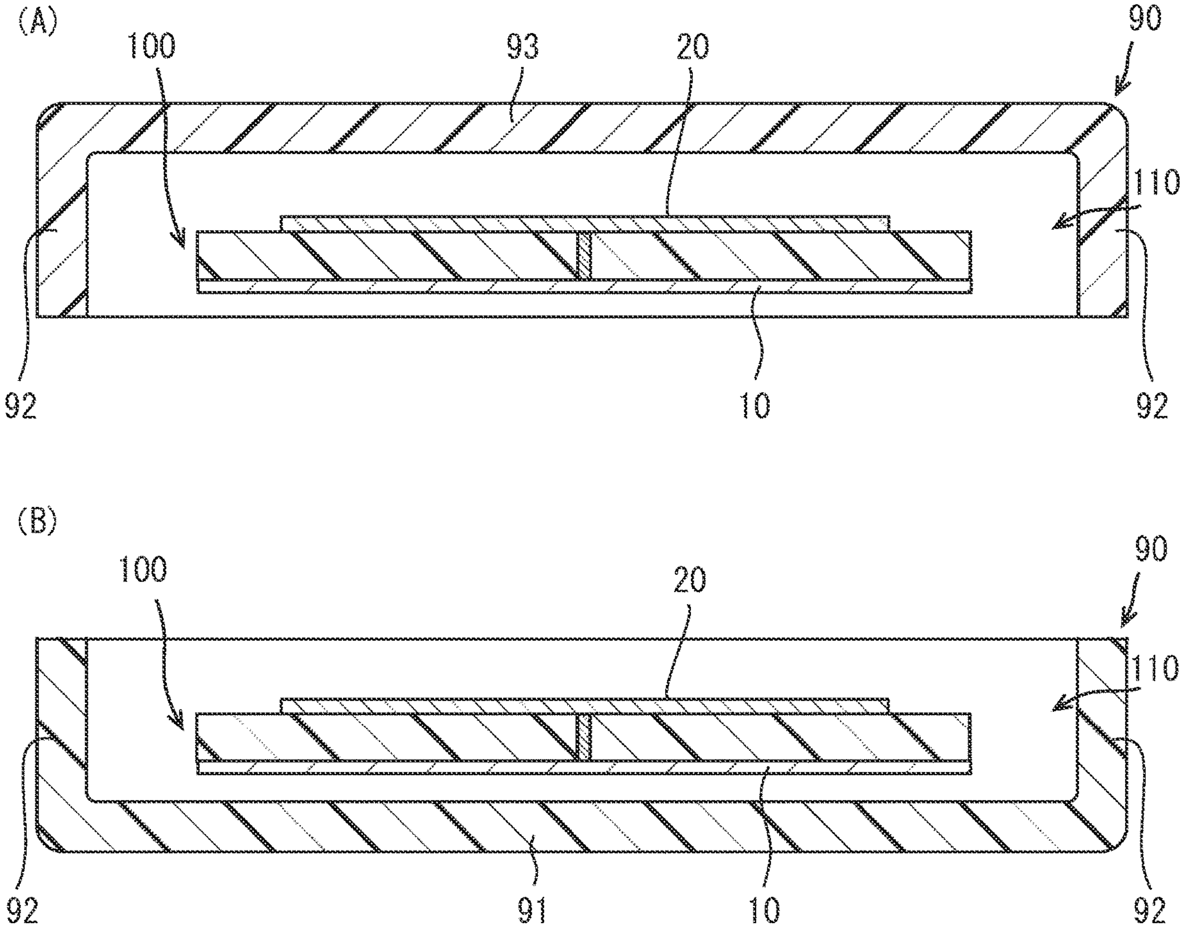
FIG. 17 is a diagram showing a modified example of the case.

In the case 90, the case bottom portion 91 may be omitted as shown in (A) of FIG. 17. Further, in the case 90, as shown in (B) of FIG. 17, the case top plate portion 93 may be omitted. When either the upper side or the lower side of the case 90 is omitted (that is, when it becomes an opening), the sealing material 110 may be preferably realized by using a resin that maintains solidity in the range assumed as the temperature of the environment in which the antenna device 1 is used (hereinafter, the operating temperature range). The operating temperature range can be, for example, −30° C. to 100° C.

While the present disclosure has been described in accordance with the embodiment, it is understood that the present disclosure is not limited to such embodiments or structures. The present disclosure also encompasses various modified examples and modifications within a uniform range. In addition, various combinations and forms, and further, other combinations and forms including only one element, or more or less than these elements are also within the sprit and the scope of the present disclosure.

What is claimed is:

1. An antenna device comprising:

a ground plate made of a conductor with a flat plate shape;

an opposing conductive plate made of another conductor with a flat plate shape, arranged to space apart from the ground plate by a predetermined distance, and having a power supply point electrically connected to a power supply line;

a short-circuit portion electrically connecting the opposing conductive plate and the ground plate; and a radio wave shield body for shielding a propagation of an electric field, which is arranged on an upper side of the opposing conductive plate and is made of a conductor or a dielectric material, wherein:

parallel resonance at a predetermined target frequency is generated by an inductance provided in the short-circuit portion and a capacitance between the ground plate and the opposing conductive plate; and the radio wave shield body is arranged so as to contact with an upper surface of an edge portion of the opposing conductive plate.

2. The antenna device according to claim 1, wherein:

a distance between the radio wave shield body disposed above the edge portion of the opposing conductive plate and the edge portion of the opposing conductive plate is 1/25 or less of a wavelength at the target frequency.

3. The antenna device according to claim 1, wherein:
the radio wave shield body includes an upright portion that stands upright from the edge portion of the opposing conductive plate.

4. The antenna device according to claim 1, wherein:
the ground plate and the opposing conductive plate are arranged on a support plate made of a resin material, the antenna device further comprising:
a resin case for accommodating the support plate, wherein:
the case includes a case top plate portion located above the opposing conductive plate; and
a distance between the support plate and the case top plate portion is 1/25 or less of a wavelength at the target frequency to function the case top plate portion as the radio wave shield body.

5. The antenna device according to claim 4, wherein:
the case includes a case bottom opposing the ground plate at a predetermined distance therebetween; and
the case bottom includes a lower support portion that contacts with an edge portion of the ground plate.

6. The antenna device according to claim 4, wherein:
a resin material having a relative permittivity of 2.0 or more is filled as a sealing member between the support plate and the case.

7. The antenna device according to claim 1, wherein:
the ground plate and the opposing conductive plate are arranged on a support plate made of a resin material, the antenna device further comprising:
a resin case for accommodating the support plate, wherein:
the case includes a case top plate portion located above the opposing conductive plate; and
the case top plate portion includes an edge contact portion that contacts the edge portion of the opposing conductive plate.

8. The antenna device according to claim 1, wherein:
a width of the ground plate in a predetermined direction is one wavelength or less of the radio wave at the target frequency;
an upper shield body as the radio wave shield body is arranged on an upper side of the opposing conductive plate; and
a lower shield body for shielding the propagation of the electric field, which is made of a conductor or a dielectric material, and is arranged on a lower side of the ground plate.

9. The antenna device according to claim 8, wherein:
the ground plate and the opposing conductive plate are arranged on a support plate made of a resin material, the antenna device further comprising:
a resin case for accommodating the support plate, wherein:
the case includes a case bottom opposing the ground plate at a predetermined distance therebetween; and
a distance between the support plate and the case bottom is 1/25 or less of the wavelength at the target frequency to function the case bottom as the lower shield body.

10. The antenna device according to claim 9, wherein:
the case includes a case side wall that stands upward from an edge of the case bottom;
the case side wall is arranged higher than an upper surface of the support plate; and
an inside of the case is filled with a resin material having a relative permittivity of 2.0 or more as a sealing material for covering the upper surface of the support plate.

* * * * *